UNITED STATES PATENT OFFICE.

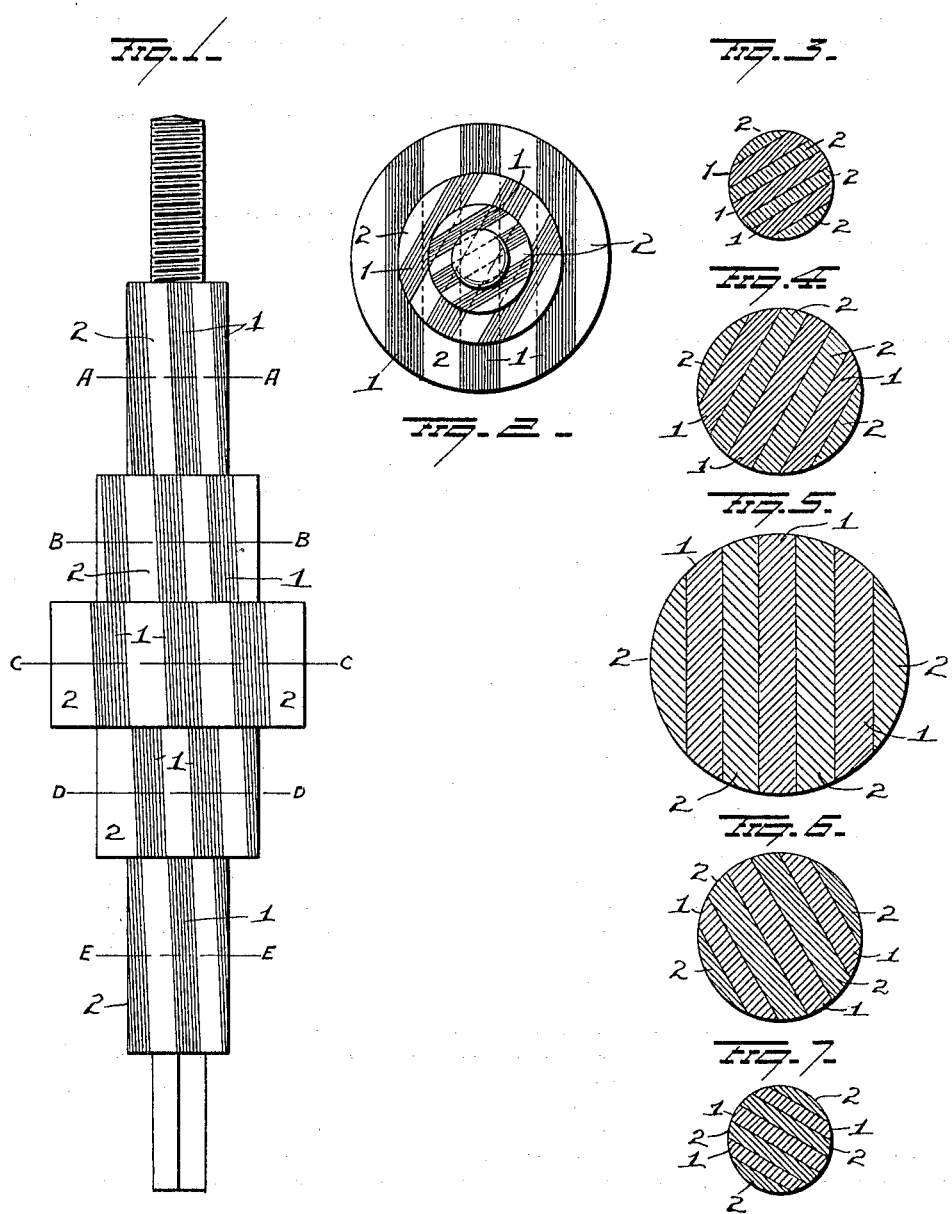

WARREN H. TAYLOR, OF STAMFORD, CONNECTICUT, ASSIGNOR TO THE YALE & TOWNE MANUFACTURING COMPANY, OF STAMFORD, CONNECTICUT.

SPINDLE FOR BURGLAR-PROOF SAFE OR VAULT DOORS.

1,053,753. Specification of Letters Patent. Patented Feb. 18, 1913.

Application filed November 26, 1912. Serial No. 733,663.

*To all whom it may concern:*

Be it known that I, WARREN H. TAYLOR, of Stamford, in the county of Fairfield and State of Connecticut, have invented certain new and useful Improvements in Spindles for Burglar-Proof Safe or Vault Doors; and I do hereby declare the following to be a full, clear, and exact description of the invention, such as will enable others skilled in the art to which it appertains to make and use the same.

My invention relates to an improvement in spindles for burglar-proof safe or vault doors, the object being to provide a spindle that will be drill proof and at the same time sufficiently ductile or elastic to resist hard blows, and it consists in the details of construction as will be more fully described and pointed out in the claims.

In the accompanying drawings, Figure 1 is a view in elevation of a spindle embodying my invention. Fig. 2 is an end view and Figs. 3, 4, 5, 6 and 7 are views in cross section respectively on the lines A—A; B—B; C—C; D—D; and E—E of Fig. 1.

The spindle illustrated is made with three different diameters, but this is not essential, as this invention contemplates a spindle either uniform or any varying dimension or dimensions throughout its length, and made up of layers 1 and 2 of alternately hard and soft metals, the said metals being welded or otherwise joined together, and irregularly disposed throughout the length of the spindle so that at closely adjacent cross sections, the hard and soft portions will be staggered or out of line with reference to the vertical diameter of the spindle. In other words the disposition of the hard and soft portions 1 and 2 of the spindle is such, that if cross sections at different parts of the spindle should be made, it would be found that there are no continuous layers of either soft or hard metal extending for any considerable distance longitudinally through the spindle. The result of this construction is, that if a drill should be started in the soft metal and run in the longitudinal direction of the spindle, it would, after a short penetration, encounter the hard metal which it could not penetrate. This result can be brought about by the proper selection and arrangement of the stock from which the spindle is made, so that the hard and soft portions will be staggered in the direction of the length of the spindle, or it can be made by making the spindle in sections and welding the sections together. The layers of hard and soft metal are preferably parallel to the long axis of the spindle or more or less oblique thereto, and are secured together by electric welding or otherwise to produce a continuous laminated spindle.

By combining the drill proof metal with a softer metal the latter imparts to the spindle as a whole sufficient ductility or elasticity to prevent it from being shivered or broken by blows.

Having fully described my invention what I claim as new and desire to secure by Letters-Patent, is:—

1. A spindle for burglar-proof doors made up of layers of hard and soft metal, alternately disposed both transversely and longitudinally of the spindle.

2. A spindle for burglar-proof doors, made up of layers of alternately hard and soft metal, welded or otherwise solidly joined together, and irregularly disposed throughout the length of the spindle, and so arranged that at closely adjacent cross sections of the spindle said hard and soft portions would be staggered or out of line with reference to the vertical diameter of the spindle.

In testimony whereof, I have signed this specification in the presence of two subscribing witnesses.

WARREN H. TAYLOR.

Witnesses:
SCHUYLER MERRITT,
EDITH M. CROZIER.

Copies of this patent may be obtained for five cents each, by addressing the "Commissioner of Patents, Washington, D. C."